US011905496B2

(12) United States Patent
Scogin

(10) Patent No.: US 11,905,496 B2
(45) Date of Patent: Feb. 20, 2024

(54) MICROBIOLOGICAL CLEANING FORMULATIONS

(71) Applicant: Verde Environmental, Inc., Houston, TX (US)

(72) Inventor: William L. Scogin, Houston, TX (US)

(73) Assignee: Verde Environmental, Inc., Houston, TX (US)

( * ) Notice: Subject to any disclaimer, the term of this patent is extended or adjusted under 35 U.S.C. 154(b) by 420 days.

(21) Appl. No.: 17/162,537

(22) Filed: Jan. 29, 2021

(65) Prior Publication Data

US 2022/0243147 A1 Aug. 4, 2022

(51) Int. Cl.

| | |
|---|---|
| ***C11D 1/66*** | (2006.01) |
| ***C11D 1/72*** | (2006.01) |
| ***C11D 1/722*** | (2006.01) |
| ***C11D 3/26*** | (2006.01) |
| ***C11D 3/32*** | (2006.01) |
| ***C11D 3/38*** | (2006.01) |
| ***C11D 3/386*** | (2006.01) |
| ***A62D 3/02*** | (2007.01) |
| ***B08B 3/04*** | (2006.01) |
| ***C11D 11/00*** | (2006.01) |
| *A62D 101/20* | (2007.01) |

(52) U.S. Cl.

CPC ................ *C11D 3/381* (2013.01); *A62D 3/02* (2013.01); *C11D 1/72* (2013.01); *C11D 3/323* (2013.01); *C11D 11/0017* (2013.01); *C11D 11/0023* (2013.01); *A62D 2101/20* (2013.01)

(58) Field of Classification Search

CPC .. C11D 1/66; C11D 1/72; C11D 1/722; C11D 3/26; C11D 3/32; C11D 3/323; C11D 3/38; C11D 3/381; C11D 3/386; A62D 3/02; B08B 3/04

See application file for complete search history.

(56) References Cited

U.S. PATENT DOCUMENTS 5,658,961 A * 8/1997 Cox, Sr. .................... B09C 1/10 521/65
6,527,970 B1 * 3/2003 Scogin ..................... A62D 3/02 521/65
2010/0197552 A1 * 8/2010 Koyuncu ........... C11D 3/38618 510/236
2010/0197554 A1 * 8/2010 Koyuncu ............... C11D 3/323 510/236

* cited by examiner

*Primary Examiner* — Brian P Mruk
(74) *Attorney, Agent, or Firm* — Osha Bergman Watanabe & Burton LLP

(57) ABSTRACT

Microbiological cleaning formulations may include an aqueous solution of a microbial component comprising at least one sporogenous microbial species. The microbiological cleaning formulation may also include a nonionic surfactant. The microbiological cleaning formulations may further include additives, solvents, preservatives, stabilizers, and fragrance agents. The microbiological formulations are such that they may removes organic carcinogens from a surface of a material contaminated during firefighting-related activities or from exposure to organic carcinogens. Corresponding methods for removing organic carcinogens from a surface of a firefighting material may include applying the microbiological cleaning formulation on the surface of the firefighting material. Corresponding cleaning kits may include the microbiological cleaning formulation and an optional scrubbing element.

12 Claims, No Drawings

MICROBIOLOGICAL CLEANING FORMULATIONS

BACKGROUND

Firefighting is a dangerous profession. In addition to burns, smoke inhalation, and other physical injuries related to fire or heat, firefighters may also be exposed to hazardous chemicals including many carcinogens such as benzene, formaldehyde, or polychlorinated biphenyls (PCBs). The microscopic particles of incomplete combustion including these toxic chemicals may be present in the smoke of all types of fires. For example, cancer-causing toxins may be present in structure fires, car fires, dumpster fires, wildland fires, and smoke from any fire in general. Firefighting-related exposure to such toxins has resulted in the increase of firefighter cancers. In particular, studies have shown that firefighters have a 60% or more increased risk of developing some form of cancer than the general population in the U.S.

Personal protective clothing, equipment, material, and gear used during firefighting may be exposed to contaminating materials during first responder situations. Such contamination may result in an increased risk of cancer by creating further exposure to carcinogens during the handling of these materials. Current methods for removing contaminants from the surface of firefighting equipment may involve the use of surfactants including detergents and soaps, disinfectants, water wash, or acidic or basic solutions. Another approach may include hot air washing, where the equipment is placed in a room or chamber and bathed in 120° to 250° F. dry air. The washed air is then exhausted through filter banks of activated charcoal. Air washing may require 24 to 48 hours to be effective, depending on the type and extent of contamination.

However, these methods are not without limitations. For example, surfactant-based aqueous solutions commonly used in cleaning and decontamination applications may have poor wetting characteristics when used on certain polymeric surfaces. Additionally, many detergent and water preparations used in cleaning and decontamination applications may contain foams, which may be problematic in terms of the disposal and destruction of contaminated suds. Hot air washing may require the installation of additional bulky and costly equipment. Furthermore, many available cleaning and decontaminating agents are not effective at cleaning some porous surfaces that may be on some firefighting equipment and gear. In addition, known cleaning preparations may not fully remove carcinogen toxins resulting from firefighting-related exposure. Thus, a need exists for an improved cleaning and/or decontaminating agent that would remove carcinogen toxins present on personal protective clothing, equipment, and material used during firefighting.

SUMMARY

In one aspect, the present disclosure is directed to microbiological cleaning formulations including an aqueous solution of a microbial component comprising at least one sporogenous microbial species. The microbiological cleaning formulations may also include a nonionic surfactant. The microbiological cleaning formulations may further include additives, solvents, preservatives, stabilizers, and fragrance agents. The microbiological formulations are such that they removes organic carcinogens from a surface of a material contaminated during firefighting-related activities or from exposure to organic carcinogens.

In another aspect, disclosed herein are methods for removing organic carcinogens from a surface of a firefighting material. The methods may include applying on the surface of the firefighting material a microbiological cleaning formulation comprising at least one sporogenous microbial species and a nonionic surfactant.

In another aspect, disclosed herein are cleaning kits including the microbiological cleaning formulation and an optional scrubbing element.

Other aspects and advantages of this disclosure will be apparent from the following description made with reference to the appended claims.

DETAILED DESCRIPTION

An aspect of the present disclosure is to provide microbiological cleaning formulations effective in bioremediating carcinogen toxins, contaminants, or organic carcinogens present on personal protective clothing, equipment, material, and gear, including firefighting personal protective equipment (PPE), due to firefighting-related exposure. The microbiological cleaning formulations may include microbes in an aqueous solution where the microbes' growth and reproductive rates are stabilized. One or more aspects of the present disclosure provide microbiological cleaning formulations including stabilized aqueous solutions of bioremediating components and nonionic surfactant, and their combined use for the removal of carcinogen toxins, contaminants, or organic carcinogens from clothing, equipment, and material that have been contaminated during firefighting-related activities or by exposure to such carcinogen toxins, contaminants, or organic carcinogens, thus resulting in reduced cancer risks for anyone in contact with these materials.

In some aspects, a method is provided for removing carcinogenic toxins, contaminants, or organic carcinogens from a surface of a firefighting material by applying on the surface of the firefighting material a microbiological cleaning formulation. In one formulation, a mixture of aqueous microbial solution may be blended and a nonionic surfactant may be added to the blended mixture, which may then be further blended. The resulting solution may be concentrated for packaging and further transport and then diluted with regular tap water prior to use. The method may further include applying the microbiological cleaning formulation in sufficient quantity to cover the surface of clothing, equipment, gear, and materials, including firefighting PPE, that have been contaminated during firefighting-related activities or from exposure to such carcinogen toxins, contaminants, or organic carcinogens. The microbiological cleaning formulation may be left in contact with the firefighting material surface for a duration of a several minutes to several hours. After removal of the organic carcinogens from the surface of the contaminated clothing, equipment, or materials, the remaining formulation may be rinsed off from the contaminated clothing, equipment, gear, or materials surface using regular tap water or may be put into a washing machine.

In some aspects, a microbiological cleaning formulation may be prepared by blending an aqueous microbial solution and by then adding a nonionic surfactant to the blended mixture, which is then further blended. In some other aspects, a microbiological cleaning formulation may be prepared by blending an aqueous microbial solution with additives, and by adding a nonionic surfactant to the blended mixture, which may be then further blended. The microbiological cleaning formulation may be prepared by blending an aqueous microbial solution with additives and by adding a nonionic surfactant and further additives to the blended mixture, which may be then further blended. Other additives, solvents, preservatives, stabilizers, and fragrance agents may further be added to the microbiological cleaning formulation.

The blending of the ingredients may be performed under operating conditions of from about 40° F. to about 110° F. The aqueous microbial solution and additives may be blended for about 30 minutes. The nonionic surfactant and optional additives may be added into the blended mixture and further blended for about 30 minutes. The resulting microbiological cleaning formulation may then be packaged in a variety of sizes, such as from 1-gallon pails to 330-gallon totes. The microbiological cleaning formulation may also be concentrated and then diluted with water prior to use.

The microbiological cleaning formulation may include a diluent or aqueous solvent or carrier such as water. For example, microbiological cleaning formulation may include water in an amount of from about 0.1% to about 99% by weight relative to the total weight of the microbial cleaning formulation.

The microbiological cleaning formulation may include an aqueous microbial solution, which may itself include various microbiological strains. These microbiological strains may be selected because of their hardiness and/or their stability in the presence of a surfactant. The microbiological strains are sporogenous and include viable spore forming cultures in sufficient number to decompose the organic carcinogens and cancer-causing toxins deposed on clothing, material, and equipment from firefighting-related activities. The content of microbiological strains in the microbiological cleaning formulation may vary. For example, the microbiological cleaning formulation may contain from about several thousands to several billions of microbes per liter of solution. In addition, the microbiological cleaning formulation may include several microbiological strains in various proportions. In particular, in a microbiological cleaning formulation having a mixture of different microbes, the different species of microbes may act synergistically or may complement each other in bioremediating the organic carcinogens present on contaminated surfaces of firefighting equipment. Further, some strains may reproduce more rapidly in the presence of large amounts of specific organic carcinogens on a contaminated surface while other strains may decrease in the absence of organic components for which these strains have an affinity. Thus, with a variety of microbial strains in the cleaning formulation, various types of organic carcinogens may be removed from contaminated materials.

The aqueous microbial solution of the microbial cleaning formulation may include water and viable spore forming cultures. In particular, the solution may include bacteria spores in water. The bacteria spores are non-pathogenic. The bacteria spores may include strains of *Bacillus*. More particularly, the strains contained in the aqueous microbial solution may be of *B. subtilis, B. licheniformis*, and *B. polymyxa, B. Amyloliquifaciens, B. Pasteurii, B. Laevolacticus*, and any combination thereof.

The aqueous microbial solution may be in an amount of at least 80% by weight of the microbial cleaning formulation, such as from about 80% to about 99%, or from about 80% to about 95%, or from about 80% to about 90% by weight relative to the total weight of the microbial cleaning formulation.

The microbial cleaning formulation may contain one or more nonionic surfactants. The nonionic surfactant may act as a dispersant or as a cleaning agent in the microbial cleaning formulation. In the microbial cleaning formulation, the nonionic surfactant coexists with the bacteria cultures of the aqueous microbial solution. As such, the surfactant must be innocuous to the organics-consuming bacteria cultures used in the formulation.

A surfactant by definition is a substance that alters the surface tension of water, and there are traditionally three types: nonionic, anionic, and cationic. A fourth type, which under certain conditions may be anionic or cationic, is known as amphoteric. It is the nature of a surfactant molecule to have one end that is hydrophilic and the other hydrophobic. In particular, the microbiological cleaning formulations of the present disclosure may include nonionic surfactants. These nonionic surfactants are innocuous to the microbe cultures used in the microbiological cleaning formulation and they may even be consumed by these microbe cultures over certain periods of time.

Examples of nonionic surfactants may include compounds formed by reacting alkylphenols, such as octyl- or nonylphenols, with ethylene oxide. Such nonionic surfactants may include Triton series (Union Carbide Corporation), the Igepal series (Phone-Poulenc Corporation), the DeSonic series (Witco Corporation), the Hyonic series (Henkel Corporation), all those of the chemical class ethoxylated alkyl phenol, the Glucopon series (Henkel Corporation) and all those of the chemical class polysaccharide ether. Specific examples include DeSonic 4N, Triton X-100, Igepal Co-630, Igepal Co-730, Hyonic NP-90, Glucopon 225, Glucopon 425 and Glucopon 625. The average number of ethylene oxide molecules attached to each molecule of alkylphenol is between 1 and 12 per molecule of octyl- or nonylphenol. When the ethylene oxide molecules are between 1 and 4, the surfactant is immiscible in water, whereas if the average number of ethylene oxide molecules attached is between 4 and 6, the surfactant is dispensable in water, and 7 or above, soluble. Nonionic surfactants that may be included in the microbiological cleaning formulations of the present disclosure are those soluble in water. These nonionic surfactants have an average of from 8 to 12 molecules of ethylene oxide per molecule of alkylphenol. This includes a surfactant that is an alkylphenol and ethylene oxide derived molecule having at least from 7 to about 15 ethylene oxide moieties per alkylphenol moiety. Additional nonionic surfactants that may be used in the microbiological cleaning formulations may include ethylene oxide adducts of fatty acids, amines or other substances and their derivatives with ethylene oxide.

The nonionic surfactants may be in an amount of from about 1% to about 10%, or from about 2% to about 9%, or from about 3% to about 9% by weight relative to the total weight of the microbial cleaning formulation.

The microbiological cleaning formulation may be free or substantially free of other classes of surfactants including, for example, cationic surfactants, anionic surfactants, or fluorinated surfactants. For example, the microbiological cleaning formulation may contain less than 5% by weight, or less than 1% by weight, or less than 0.1% by weight, or less than 0.01% by weight of cationic surfactants, anionic surfactants, or fluorinated surfactants relative to the total weight of the microbial cleaning formulation. In addition, the microbiological cleaning formulation may be a non-foam composition.

The microbial cleaning formulation may contain additives such as microbial nutrients. These microbial nutrients may include nitrogen-containing nutrients such as urea. These microbial nutrients may enhance the bioremediation of organic compounds such as carcinogenic toxins. Urea may be in an amount of from about 1% to about 5% by weight relative to the total weight of the microbial cleaning formulation. Additional microbial nutrients may include diammonium phosphate, magnesium sulfate, ammonium sulfate zinc sulfate, or ammonia.

The microbiological cleaning formulation may include additives including inorganic phosphate salts. These additives may include dipotassium phosphate, disodium hydrogenphosphate, sodium hydrogenphosphate, sodium hydrogenphosphate heptahydrate, sec-sodium phosphate, sodium phosphate dibasic, or disodium phosphate, and dipotassium hydrogenphosphate, dipotassium hydrogen phosphate trihydrate, potassium hydrogenphosphate, potassium hydrogenphosphate trihydrate, sec-potassium phosphate, potassium phosphate dibasic, or potassium phosphate dibasic trihydrate. In particular, the microbiological cleaning formulation may include dipotassium phosphate in an amount of from about 0.01% to about 1% by weight relative to the total weight of the microbial cleaning formulation.

The microbiological cleaning formulation may include additives including an organic acid, such as an organosulfur acid compound. In particular, the organic acid may include benzenesulfonic acid. The organic acid may be in its acid form or its salt form when used in the present microbiological cleaning formulation. The microbiological cleaning formulation may include benzenesulfonic acid in an amount of from about 0.01% to about 1% by weight relative to the total weight of the microbial cleaning formulation.

The microbiological cleaning formulation may further include additives. These additives may include diammonium phosphate, magnesium sulfate, ammonium sulfate zinc sulfate, or ammonia. In particular, the microbiological cleaning formulation may include diammonium phosphate in an amount of from about 0.01% to about 0.1% by weight relative to the total weight of the microbial cleaning formulation.

The microbiological cleaning formulation may further include additives, such as stabilizers, preservatives, solvents, and/or fragrance agents. In particular, the microbiological cleaning formulation may include stabilizers and preservatives added to maintain the microbe population until the formulation is applied to the surface of contaminated firefighting materials. The preservatives may prevent destruction of the microbial cultures by toxic organisms. The presence of such preservatives may enhance the storage life of the invention. The presence of a stabilizer may help to maintain the microbe population substantially constant until the microbe solution is brought into contact with contaminated firefighting materials. Preservatives contained in the microbiological cleaning formulation may include isothiazolones such as 1,2-benzisothiazol-3(2H)-one. Additional solvents or fragrance agents may be present in the microbiological cleaning formulation. These solvents or fragrance agents may include turpentine and/or linalol. These solvents or fragrance agents may be added to the microbiological cleaning formulation to improve smell. In particular, the microbiological cleaning formulation may include 1,2-benzisothiazol-3(2H)-one in an amount of from about 0.01% to about 0.1% by weight relative to the total weight of the microbial cleaning formulation. In addition, the microbiological cleaning formulation may include turpentine in an amount of from about 0.01% to about 0.1% by weight relative to the total weight of the microbial cleaning formulation. Further, the microbiological cleaning formulation may include linalol in an amount of from about 0.01% to about 0.1% by weight relative to the total weight of the microbial cleaning formulation.

The microbiological cleaning formulation may include at least about 80% by weight of an aqueous solution of a microbial component including at least one sporogenous microbial species and from about 1% to about 10% by weight of an nonionic surfactant. The microbiological cleaning formulation may further contain additives in an amount of from about 1% to about 5%. For example, the microbiological cleaning formulation may contain from about 1% to about 5% by weight of urea. Additionally, the microbiological cleaning formulation may contain from about 0.01% to about 1% by weight of additional additives.

Methods for removing organic carcinogens from a surface of a firefighting material are also provided. A firefighting material may include a material, such as personal protective clothing, equipment, and gear, including firefighting PPE, contaminated during firefighting-related activities or from exposure to organic carcinogens. In some particular aspects, the methods may employ the microbiological cleaning formulation described herein. In particular, the methods may include applying the microbiological cleaning formulation on the surface of the firefighting material. Additionally, the methods may include contacting the microbiological cleaning formulation with the surface of the firefighting material for at least about 1 minute, or for at least about 5 minutes, or for at least about 10 minutes, or for at least about 30 minutes, or for at least about 1 hour. Further, the methods may include wetting the surface of the firefighting material, scrubbing areas of the surface of the firefighting material with the microbiological cleaning formulation, and rinsing the microbiological cleaning formulation from the surface of the firefighting material. Water may be used to both wet and rinse the surface being cleaned. These methods may also employ any of the specific compositions described herein. In particular, the method may include using a composition that includes an aqueous solution of a microbial component comprising at least one sporogenous microbial species and a nonionic surfactant. The methods allow the removal or bioremediation of organic carcinogens present on the surface of materials that have been contaminated during firefighting-related activities or from exposure to these organic carcinogens, thus resulting in reduced cancer risks for anyone in contact with these materials.

A cleaning kit is also provided, which may include a composition as described herein, including an aqueous solution of a microbial component comprising at least one sporogenous microbial species, a nonionic surfactant, and optional additives. The cleaning kit may also optionally include a brushing or scrubbing element. The kit may further include an insert sheet of instructions outlining the particular methods described herein for application of the composition and removal thereof.

EXAMPLE

The following example is merely illustrative and should not be interpreted as limiting the scope of the present disclosure.

In the manufacturing process to prepare the microbiological cleaning formulation of the Example, operating conditions between 40° F. and 110° F. were used. The formulation used regular filtered tap water as diluent. An aqueous microbial solution containing water and viable spore forming cultures and additives in the amounts shown in Table 1 were blended for 30 minutes to provide a first blended mixture. Ethoxylated alcohols in the amounts shown in Table 1 were then vacuum sucked into the first blended mixture and this second mixture was further blended for 30 minutes. The resulting product was packaged in a variety of sizes, from 1-gallon pails to 330-gallon totes. The product was concentrated and diluted with water prior to use.

TABLE 1

| Ingredients | CAS No | Weight-% |
|---|---|---|
| Water and viable spore forming cultures | | >80 |
| Ethoxylated Alcohols | 68439-46-3 | 3-9 |
| Additives | | 3-5 |

The microbiological cleaning formulation allowed the removal of organic carcinogens from surfaces of materials that had been contaminated during firefighting-related activities or from exposure to organic carcinogens. This removal of organic carcinogens was greater than when a regular cleaning formulation was used to clean comparable surfaces.

While only a limited number of embodiments have been described, those skilled in the art, having benefit of this disclosure, will appreciate that other embodiments can be devised that do not depart from the scope of the disclosure.

Although the preceding description has been described here with reference to particular means, materials, and embodiments, it is not intended to be limited to the particulars disclosed here; rather, it extends to all functionally equivalent structures, methods, and uses, such as those within the scope of the appended claims.

The presently disclosed methods and compositions may suitably comprise, consist, or consist essentially of the elements disclosed, and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes, and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" or "optional" mean that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

The invention claimed is:

1. A method for removing organic carcinogens from a surface of a firefighting material, the method comprising applying on the surface of the firefighting material a microbiological cleaning formulation comprising:

(a) an aqueous solution of a microbial component comprising at least one sporogenous microbial species; and (b) a nonionic surfactant, wherein the microbiological cleaning formulation further comprises urea.

2. The method of claim 1, further comprising contacting the microbiological cleaning formulation with the surface of the firefighting material for at least about 1 minute.

3. The method of claim 1, further comprising wetting the surface of the firefighting material.

4. The method of claim 1, further comprising rinsing the microbiological cleaning formulation from the surface of the firefighting material.

5. The method of claim 1, wherein the at least one sporogenous microbial species comprises one or more strains of *Bacillus*.

6. The method of claim 1, wherein the at least one sporogenous microbial species comprises one or more strains of *Bacillus* selected from the group consisting of *B. subtilis, B. licheniformis*, and *B. polymyxa, B. Amyloliquifaciens, B. Pasteurii, B. Laevolacticus*, and any combination thereof.

7. The method of claim 1, wherein the nonionic surfactant comprises an ethoxylated alcohol.

8. The method of claim 1, wherein the microbiological cleaning formulation comprises:

(a) at least about 80% by weight of the aqueous solution of microbial component; and (b) from about 1% to about 10% by weight of the nonionic surfactant.

9. The method of claim 1, wherein the microbiological cleaning formulation further comprises one or more additives selected from the group consisting of microbial nutrients, inorganic phosphate salts, organic acids, stabilizers, preservatives, solvents, and fragrance agents.

10. The method of claim 1, wherein the microbiological cleaning formulation further comprises from about 1% to about 5% by weight of the one or more additives.

11. The method of claim 1, wherein the microbiological cleaning formulation comprises from about 1% to about 5% by weight of urea.

12. The method of claim 1, wherein the microbiological cleaning formulation is free of fluorinated surfactants.

* * * * *